(12) United States Patent
Liang

(10) Patent No.: US 6,867,524 B2
(45) Date of Patent: Mar. 15, 2005

(54) ROTOR SKEW METHODS FOR PERMANENT MAGNET MOTORS

(75) Inventor: Feng Liang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 10/452,946

(22) Filed: Jun. 4, 2003

(65) Prior Publication Data

US 2004/0245880 A1 Dec. 9, 2004

(51) Int. Cl.[7] .............................................. H02K 21/12
(52) U.S. Cl. ........................... 310/156.47; 310/156.43; 310/156.45; 310/156.44; 310/156.46; 310/51; 310/261
(58) Field of Search ....................... 310/156.43–156.47, 310/261, 51

(56) References Cited

U.S. PATENT DOCUMENTS

| | | | | |
|---|---|---|---|---|
| 4,739,201 A | * | 4/1988 | Brigham et al. | 310/156.64 |
| 4,954,736 A | * | 9/1990 | Kawamoto et al. | 310/156.21 |
| 5,355,044 A | * | 10/1994 | Uchida et al. | 310/156.47 |
| 5,397,951 A | * | 3/1995 | Uchida et al. | 310/156.21 |
| 5,760,503 A | * | 6/1998 | Tsuchida et al. | 310/49 R |
| 5,886,440 A | | 3/1999 | Hasebe et al. | 310/156.19 |
| 6,252,323 B1 | * | 6/2001 | Nishikawa et al. | 310/156.01 |
| 6,462,452 B2 | | 10/2002 | Nakano et al. | 310/156.47 |
| 6,498,449 B1 | | 12/2002 | Chen et al. | 318/434 |

* cited by examiner

*Primary Examiner*—Karl Tamai
*Assistant Examiner*—Yahveh Comas

(57) ABSTRACT

A permanent magnet motor to reduce torque ripple includes a rotor having at least three segments. Each of the three segments is formed sequentially adjacent and aligned along an axis of the rotor. Each segment has at least one pair of permanent magnets disposed at a substantially equal interval in a peripheral direction of the rotor. First and second segments are skewed relative to each other by a first angular displacement, and the first and third segments are skewed relative to each other by a second angular displacement. The first and second angular displacements are selected to cause a net sum of torque ripple produced by each of the segments to be substantially equal to zero during an operation of the motor.

8 Claims, 9 Drawing Sheets

ROTOR SKEW METHODS FOR PERMANENT MAGNET MOTORS

BACKGROUND OF THE INVENTION

1. Field of the Invention

The present invention relates to an electric motor, and more particularly to a structure of a rotor assembly of a permanent magnet motor to improve the motor performance and reduce torque ripple.

2. Description of the Relevant Art

The motor is a well-known electrical machine that converts electrical energy into mechanical energy using magnetic field linkage. Permanent magnet ('PM') electric motors are known for their high efficiency. In recent years, especially since the introduction of rare-earth magnetic materials, PM motors have become popular since they eliminate the need for commutator and brushes, which are commonly used with conventional DC electric motors. The absence of the external rotor excitation eliminates losses on the rotor and makes PM motors more efficient. It is well known that electrical motors equipped with commutator and brushes are susceptible to higher maintenance costs. The brushless design of the PM motors allows the conductor coils to be located in a stationary motor stator, which reacts to movement of a rotor that includes the PM's.

PM motors are also known for their durability, controllability, and absence of electrical sparking. Thanks to their advantages the PM motors are widely used in such applications as electric vehicles and servo applications. However, one of the well-known problems of the PM motors is torque ripple. Sources of torque ripple in the PM motors include inherent harmonics in the flux linkage, and cogging. Cogging is a term used to describe the torque of a PM motor disconnected from the power source. Presence of harmonics in the flux linkage results in instantaneous torque that pulsates as a function of the rotor position.

Torque ripple is generally undesirable in many PM motors applications, particularly at low speeds. In the past many techniques have been proposed to minimize torque ripple. Some of these techniques are described in further detail in the following U.S. patents, which are hereby incorporated herein by reference into this specification: 1) U.S. Pat. No. 6,462,452 to Nakano, et al., entitled 'Permanent magnet motor', 2) U.S. Pat. No. 5,886,440 to Hasebe, et al., entitled 'Electric motor with plural rotor portions having pole members of different widths', and 3) U.S. Pat. No. 6,498,449 to Chen, et al. entitled 'Low ripple torque control of a permanent magnet motor without using current sensors'.

However, many of the techniques describe a controls based solution to ripple torque reduction. This generally results in the deployment of additional control circuits and/or sensors to reduce the torque ripple. The additional controls add to the complexity and cost. Some other techniques describe a skewing arrangement between the stator and the rotor to reduce the ripple torque. For example, the skewing techniques described by Nakano provide a skew having an electric angle of 72 degree relatively between the rotor and the stator to reduce the fifth harmonic. This results in targeting the reduction of a specific harmonic element in the torque ripple. Additionally, the exact skewing arrangement between the rotor and stator generally results in a higher complexity in design and a higher manufacturing cost.

Thus, a need exists to provide an improved PM motors that offers reduced torque ripple. Specifically, it would be desirable for the improved PM motor to be cost effective, be easy to manufacture and be applicable to any stator design.

SUMMARY OF THE INVENTION

The problems outlined above are addressed in a large part by an apparatus and method for reducing torque ripple of a permanent magnet motor, as described herein. According to one form of the invention, the permanent magnet motor includes a rotor having at least three segments. Each of the three segments is formed sequentially adjacent and aligned along an axis of the rotor. Each segment has at least one pair of permanent magnets disposed at a substantially equal interval in a peripheral direction of the rotor. First and second segments are skewed relative to each other by a first angular displacement, and the first and third segments are skewed relative to each other by a second angular displacement. The first and second angular displacements are selected to cause a net sum of torque ripple produced by each of the segments to be substantially equal to zero during an operation of the motor.

According to another aspect of the invention, the method for reducing torque ripple of the permanent magnet motor includes segmenting the rotor of the motor into at least three rotor segments having a first, second and third rotor segments. The at least three rotor segments are formed sequentially adjacent along the axis of the rotor. Each of the at least three rotor segments includes the at least one pair of permanent magnets disposed at the substantially equal interval in a peripheral direction of the rotor. The second rotor segment is skewed relative to the first rotor segment along the axis to cause the first angular displacement and the third rotor segment relative to the first rotor segment along the axis to cause the second angular displacement. The first and second angular displacements are selected to cause a net sum of torque ripple produced by each of the at least three segments to be substantially equal to zero during an operation of the motor.

Other forms, as well as objects and advantages of the invention will become apparent upon reading the following detailed description and upon reference to the accompanying drawings.

BRIEF DESCRIPTION OF THE DRAWINGS

Novel features believed characteristic of the invention are set forth in the appended claims. The invention itself, however, as well as a preferred mode of use, various objectives and advantages thereof, will best be understood by reference to the following detailed description of an illustrative embodiment when read in conjunction with the accompanying drawings, wherein:

DETAILED DESCRIPTION OF AN EMBODIMENT

Figure 1A:
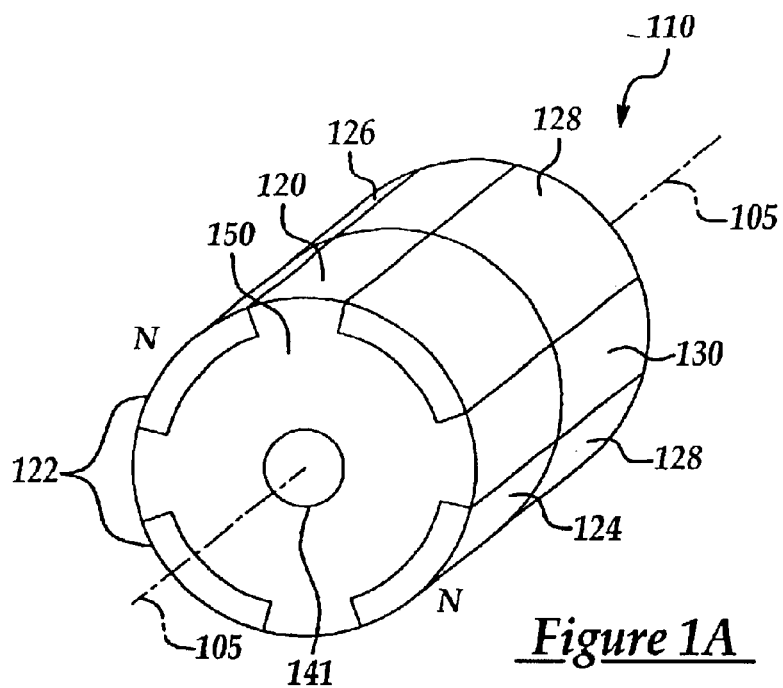
FIG. 1A is a view in perspective of a rotor assembly of a PM motor having two segments, according to an embodiment of the present invention.

While the invention is susceptible to various modifications and alternative forms, specific embodiments thereof are shown by way of example in the drawings and will be described herein in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Elements, which appear in more than one figure herein, are numbered alike in the various figures. The present invention describes an apparatus and method to reduce torque ripple of a PM motor. According to one form of the invention, the PM motor includes a rotor having at least three segments. Each of the three segments are formed adjacent to another and aligned along an axis of the rotor. Each segment has at least one pair of permanent magnets disposed at a substantially equal interval in a peripheral direction of the rotor. First and second segments are skewed relative to each other by a first angular displacement, and the first and third segments are skewed relative to each other by a second angular displacement. The first and second angular displacements are selected to cause a net sum of torque ripple produced by each of the segments to be substantially equal to zero during an operation of the motor.

FIG. 1A is a view in perspective of a rotor 110 assembly of a PM motor (not shown) having two segments, according to an embodiment. The rotor 110 shown has a first rotor segment 120 formed along an axis 105 of the rotor. A second rotor segment 130 is formed along the axis 105 of the rotor 110 and is sequentially adjacent to the first segment 120. The first segment 120 has two pairs of north-south permanent magnets 122 and 124 disposed at a substantially equal interval in a peripheral direction of the rotor 110. In this embodiment, the PM's 122 and 124 are disposed at a right angle to each other in a peripheral direction of the rotor 110. In alternative embodiments, any number of pairs of north-south permanent magnets may be included.

The second segment 130 also has two pairs of north-south permanent magnets 126 and 128 disposed at the substantially equal interval in the peripheral direction of the rotor 110. In this embodiment, the PM's 126 and 128 are disposed at a right angle to each other in a peripheral direction of the rotor 110. Thus, PM's 126 and 128 are aligned with the corresponding pairs of north-south permanent magnets 122 and 124. In alternative embodiments, the second segment 130 may include any number of north-south permanent magnets.

Figure 1B:
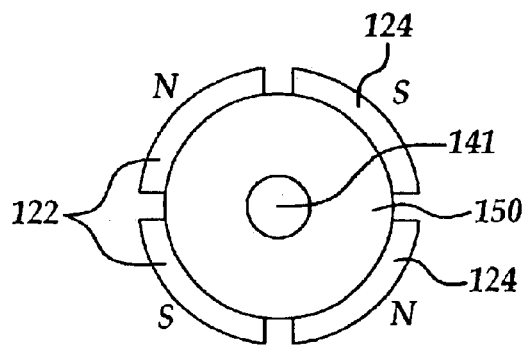
FIG. 1B illustrates surface mounted PM's in a cross sectional view of the rotor assembly shown in FIG. 1A, according to an embodiment.
Figure 1C:
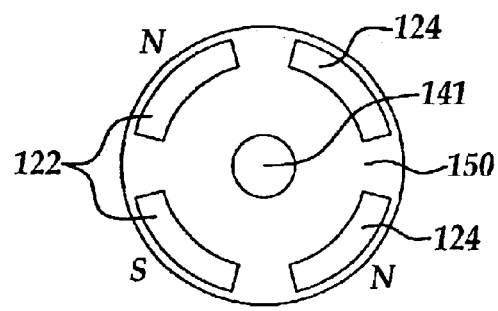
FIGS. 1C and 1D illustrate interior PM's in a cross sectional view of the rotor assembly shown in FIG. 1A, according to an embodiment.
Figure 1D:
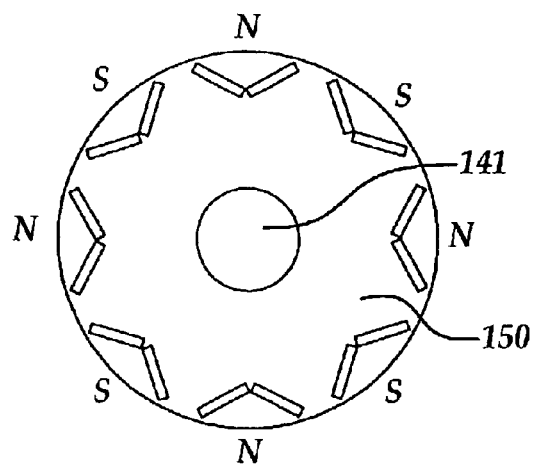

The four pairs of PM's 122, 124, 126 and 120 are substantially matched in terms of their properties such as their magnetic field strength and dimensions. The rotor 110 assembly includes a shaft 141 and a core 150, both of which are aligned with the axis 105 of the rotor. The shaft 141 typically transfers the rotational energy to an external object (not shown). The core 150 may be made from ferrite materials, laminations or solid steel depending on the application requirements. The core 150 serves as a secure anchor for the four pairs of PM's 122, 124, 126 and 128 and also provides the desired magnetic behavior. The rotor 110 assembly may also include other mounting options for the four pairs of PM's 122, 124, 126 and 128. FIG. 1B illustrates surface mounted PM's in a cross sectional view of the rotor 110 shown in FIG. 1A, according to an embodiment. FIGS. 1C and 1D illustrate interior PM's in a cross sectional view of the rotor 110 shown in FIG. 1A, according to an embodiment.

Figure 2:
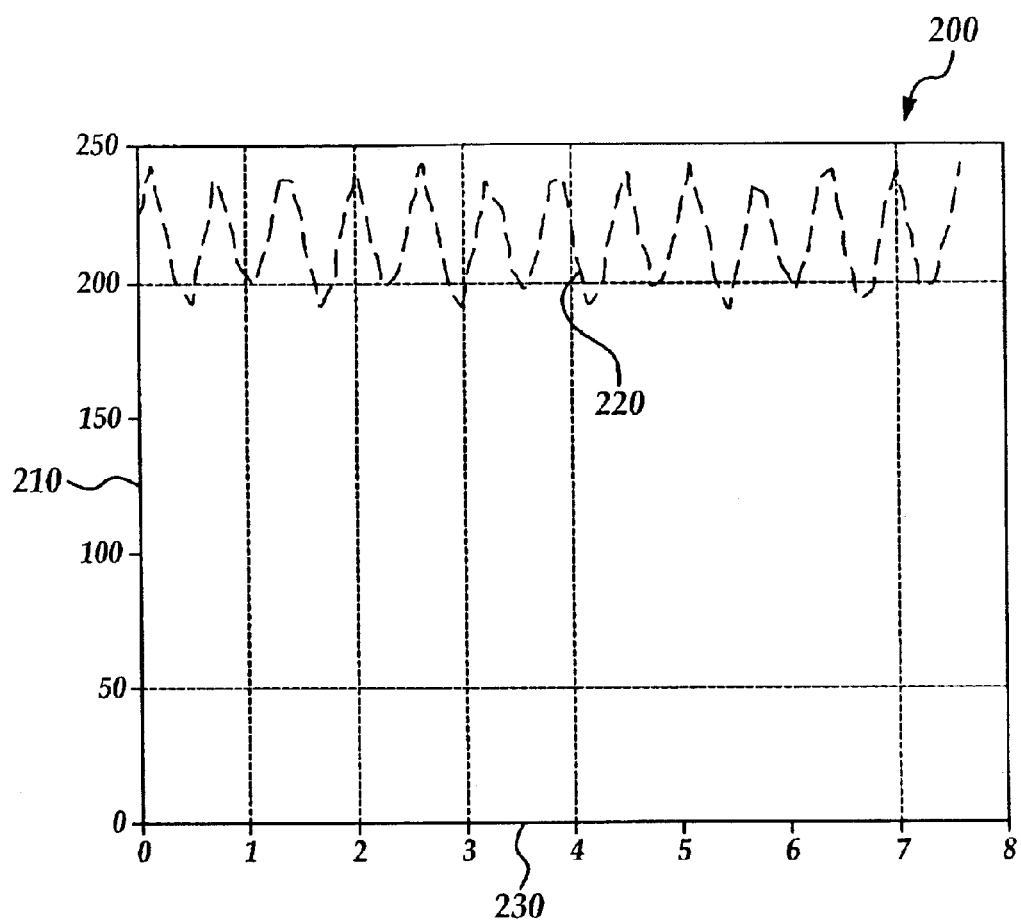
FIG. 2 is a representative graph of the torque ripple of a PM motor without a skewed rotor, according to an embodiment.
Figure 3:
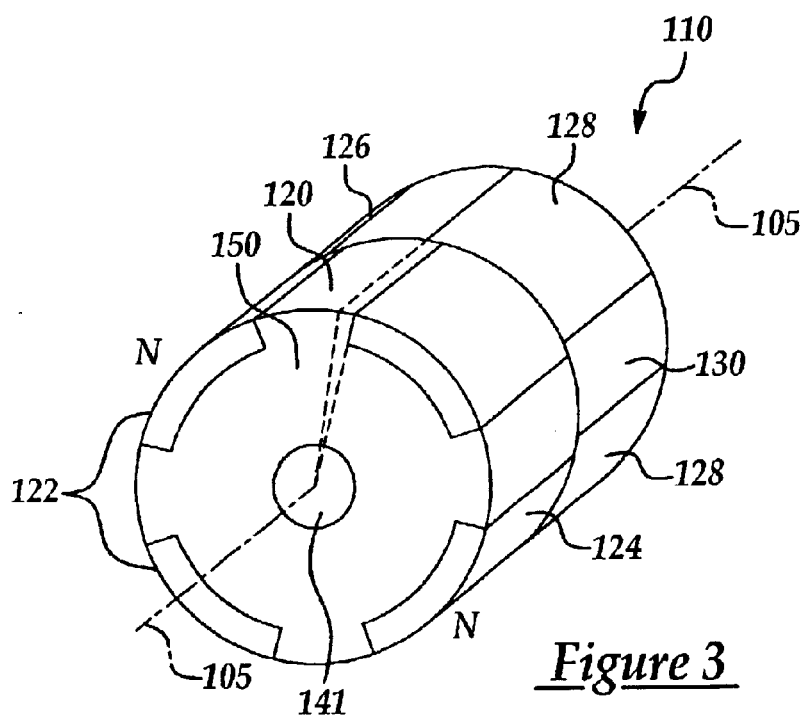
FIG. 3 is a view in perspective of a rotor assembly of a PM motor having two skewed segments, according to an embodiment.

As is well known, PM motors, including the PM motor having the rotor 110, produces a torque ripple. Referring to FIG. 2, a representative graph 200 of the PM motor torque ripple 220 is shown. The torque ripple graph 200 is typically generated simply by plotting a value of torque 210 on the y-axis versus time 230 on the x-axis. The torque 210 is generally measured in units of force such as a newton-meter ('NM'). The time 230 shown on the x-axis is measured in milliseconds. The particular shape of the torque ripple 220 may vary depending on various factors such as stator design including number of pole pairs, rotor design and magnetic flux leakage FIG. 3 is a view in perspective of a rotor 110 assembly of a PM motor (not shown) having two skewed segments, according to an embodiment. In this embodiment, the rotor 110 has two rotor segments 120 and 130, which are skewed relative to each other. As described earlier, the first rotor segment 120 is formed along the axis 105 of the rotor and the second rotor segment 130 is formed along the axis 105 of the rotor 110 and is sequentially adjacent to the first segment 120.

In this embodiment, the first and second segments 120 and 130 are skewed relative to each other by a first angular displacement 140. As is well known, an angular displacement may also be represented as a peripheral displacement, for a specified radius. Thus, the first angular displacement 140 may also be represented as a first peripheral displacement (not shown) for a given radius of the rotor 110. Also, the skew between two segments is generally measured with one segment being selected as a reference, and the other segment being slightly rotated along the axis 105 in a clockwise or counterclockwise direction to generate the skew.

Thus PM's 126 and 128 are skewed with the corresponding airs of north-south permanent magnets 122 and 124 by the first angular displacement 140. In alternative embodiments, any number of pairs of north-south permanent magnets may be included in each of the first and second segments 120 and 130.

Relative to the first segment 120, the first angular displacement 140 of the second segment 130 may occur in a clockwise or an anticlockwise direction. The value of the first angular displacement 140 is selected to cause a net sum of torque ripple produced by each of the segments 120 and 130 to be substantially equal to zero during an operation of the rotor 110 included in the PM motor. That is, the first angular displacement 140 is selected so that the torque ripple 220 produced by the first segment 120 substantially cancels the torque ripple 220 produced by the second segment 130 during the operation of the rotor 110.

Figure 4:
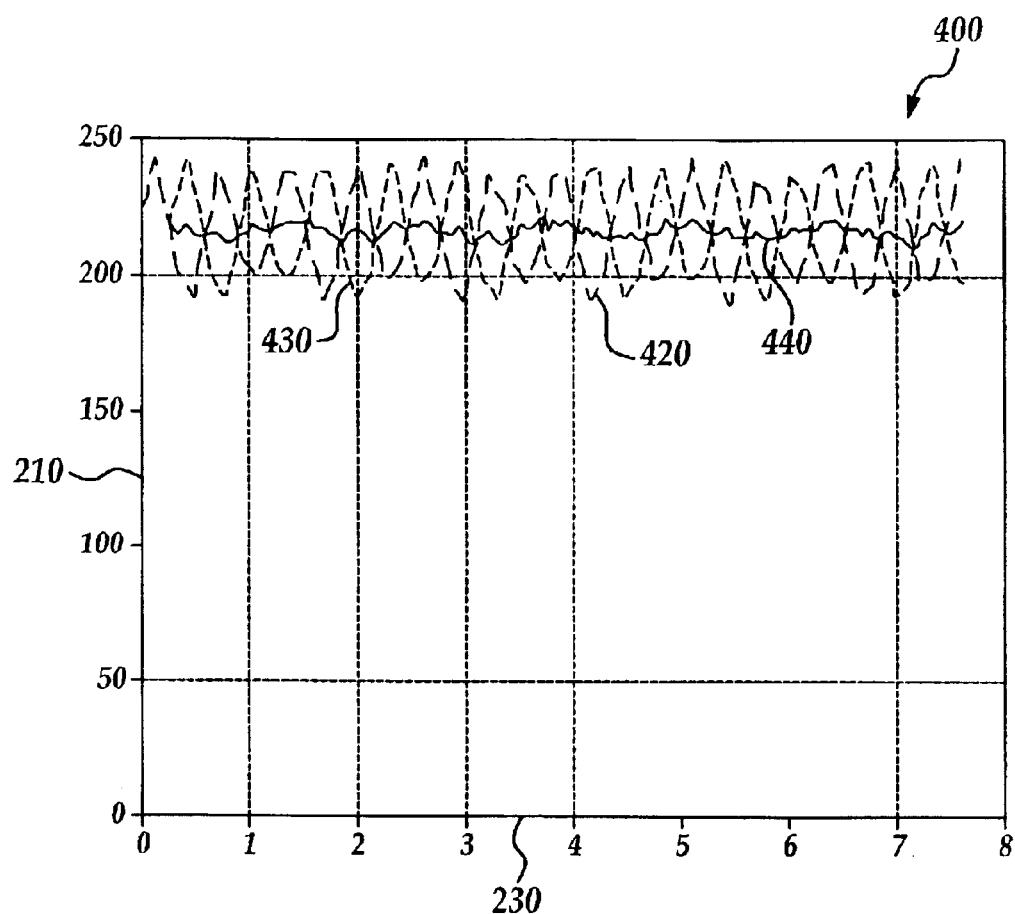
FIG. 4 is a representative graph of a combined torque ripple produced by the rotor having skewed segments illustrated in FIG. 3, according to an embodiment of the present invention.

Referring to FIG. 4, a representative graph 400 of a combined torque ripple 220 produced by the rotor 110 having skewed segments illustrated in FIG. 3 is shown, according to one embodiment. In this embodiment, by selecting a particular value of the first angular displacement 140, an instance of the torque ripple 220 (shown as torque ripple 420) produced by the first segment 120 is substantially out-of-phase with another instance of the torque ripple 220 (shown as torque ripple 430) produced by the second segment 130. As a result, the torque ripples 420 and 430 produced by the two rotor segments 120 and 130 respectively cancel each other to a large extent and the net sum (shown as torque ripple 440) of the torque ripples 420 and 430 of the PM motor is effectively reduced.

However, the rotor 110 having the two-segment skew described in FIG. 3 may cause stator and rotor torsional vibration. The biggest or most predominant AC components of the tangential forces of the first and second segments 120 and 130, which may be represented by vectors, may excite resonance of the rotor 110 and stator (not shown) thereby causing the torsional vibration. Since vectors representing the biggest AC components of the tangential forces of the first and second segments 120 and 130 are 180 degree out of phase, i.e., they have the roughly same magnitude but opposite directions, they have the biggest effect on the rotor 110 and stator torsional vibration. Test data of a PM motor having a two-segment rotor skew similar to shown in FIG. 3 suggests that the torsional vibration may cause an excessive noise at the speeds at which the vibration frequencies is the same as the resonance frequencies of the stator and the rotor.

Figure 5:
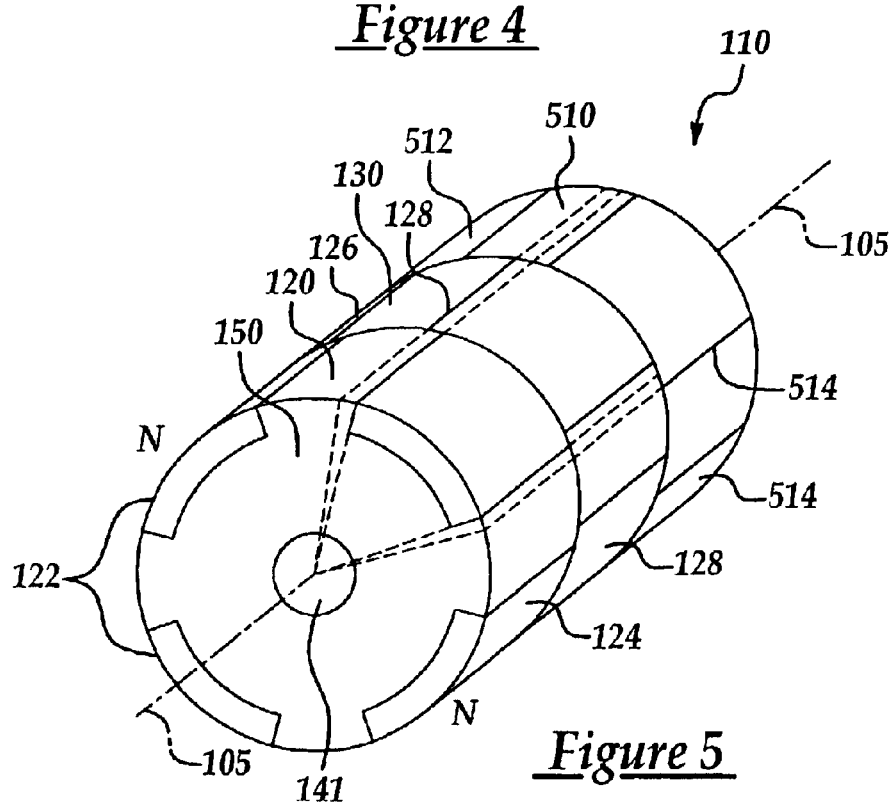
FIG. 5 is a view in perspective of a rotor assembly of a PM motor having three skewed segments, according to an embodiment of the present invention.

FIG. 5 is a view in perspective of a rotor 110 assembly of a PM motor (not shown) having three skewed segments, according to an embodiment. In this embodiment, the rotor 110 has three rotor segments 120, 130 and 510, which are skewed relative to each other. As described earlier, the first rotor segment 120 is formed along the axis 105 of the rotor and the second rotor segment 130 is formed along the axis 105 and is sequentially adjacent to the first segment 120. The third rotor segment is formed along the axis 105 and is sequentially adjacent to the second segment 130. In this embodiment, each of the three segments 120, 130 and 510 have a substantially equal axial length, which is approximately one third of the total rotor axial length.

The arrangement of the PM's 122, 124, 126 and 128 is same as described in FIG. 3. The third segment 510 has two pairs of north-south permanent magnets 512 and 514 disposed at a substantially equal interval in a peripheral direction of the rotor 110. In this embodiment, the PM's 512 (not shown) and 514 are disposed at a right angle to each other in a peripheral direction of the rotor 110.

In this embodiment, the skew is measured relative to a reference segment such as the first segment 120. That is, the skew is measured with one segment being selected as a reference, and the other adjacent segment being slightly rotated along the axis 105 in a clockwise or counterclockwise direction to generate the skew.

With the first segment 120 being selected as the reference, the second segment 130 is skewed relative to the first segment 120 to cause the first angular displacement 140. The direction of the skew may be either counterclockwise or clockwise. Thus PM's 126 and 128 are skewed with the corresponding pairs of north-south permanent magnets 122 and 124 by the first angular displacement 140. Similarly, the third segment 510 is skewed relative to the reference to cause a second angular displacement 520. The direction of the skew is opposite of the direction of the skew between the first and second segment. Thus PM's 512 and 514 are skewed with the corresponding pairs of north-south permanent magnets 122 and 124 by the second angular displacement 520. In alternative embodiments, any number of pairs of north-south permanent magnets can be included in each of the first, second and third segments 120, 130 and 510.

The value and direction of the first angular displacement 140 and the second angular displacement 520 is selected to cause a net sum of torque ripple (not shown) produced by each of the segments 120, 130 and 510 to be substantially equal to zero during an operation of the rotor 110 included in the PM motor. That is, the first angular displacement 140 and the second angular displacement 520 are selected so that the net sum or combined torque ripple vectors produced by the three segments 120, 130 and 510 substantially cancel each other during the operation of the rotor 110.

In this embodiment, the first angular displacement 140 in mechanical angle is equal to 120/K, where Equation 501 defines K as follows:

$$K=\text{(Torque Ripple Fundamental Frequency)/(Rotor Speed in revolutions per second)}. \quad \text{Equation 501}$$

Relative to the first segment 120, the direction of the first angular displacement 140 may be either counterclockwise or clockwise. Relative to the first segment 120, the second angular displacement 520 is 120/K, i.e., same as the first angular displacement 140 but the direction is opposite of the direction of the first angular displacement. As a result, relative to the first segment 120, the second segment 130 is skewed counterclockwise by an angle represented by the first angular displacement 140, and the third segment 510 is skewed clockwise by the same angle represented by the first angular displacement 140.

Figure 6:
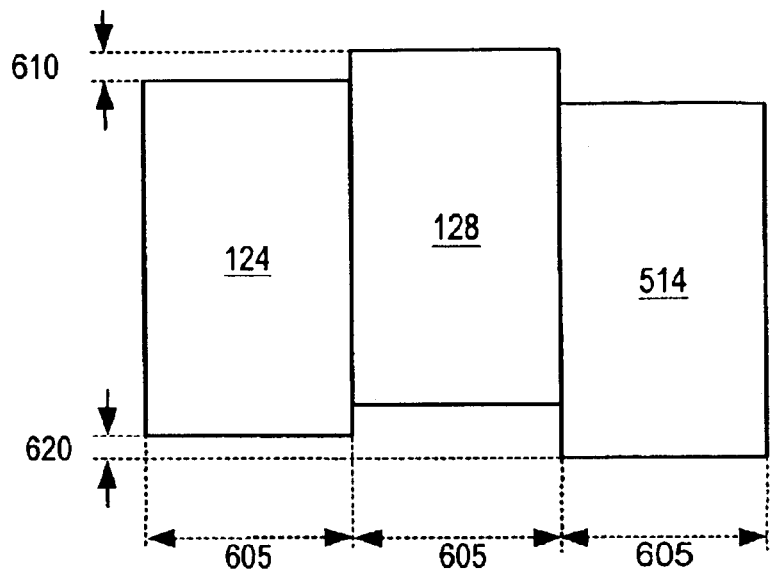
FIG. 6 illustrates relative positions of the three magnets of one pole of the skewed three segment rotor arrangement illustrated in FIG. 5, according to an embodiment.

FIG. 6 illustrates the relative positions of the three magnets of one pole of the skewed three segment rotor arrangement illustrated in FIG. 5, according to an embodiment. In this embodiment, each of the three segments 120, 130 and 510 has a substantially equal axial length 605, which is approximately one third of the total rotor axial length. The first angular displacement 140 between the first segment 120 selected as the reference and the second segment 130 is represented by a first peripheral displacement 610. Similarly, the second angular displacement 520 between the first and third segments 120 and 510 respectively is represented by a second peripheral displacement 620. In this embodiment, the second peripheral displacement 620 has the same magnitude as the first peripheral displacement 610 but is in the opposite direction.

Figure 7:
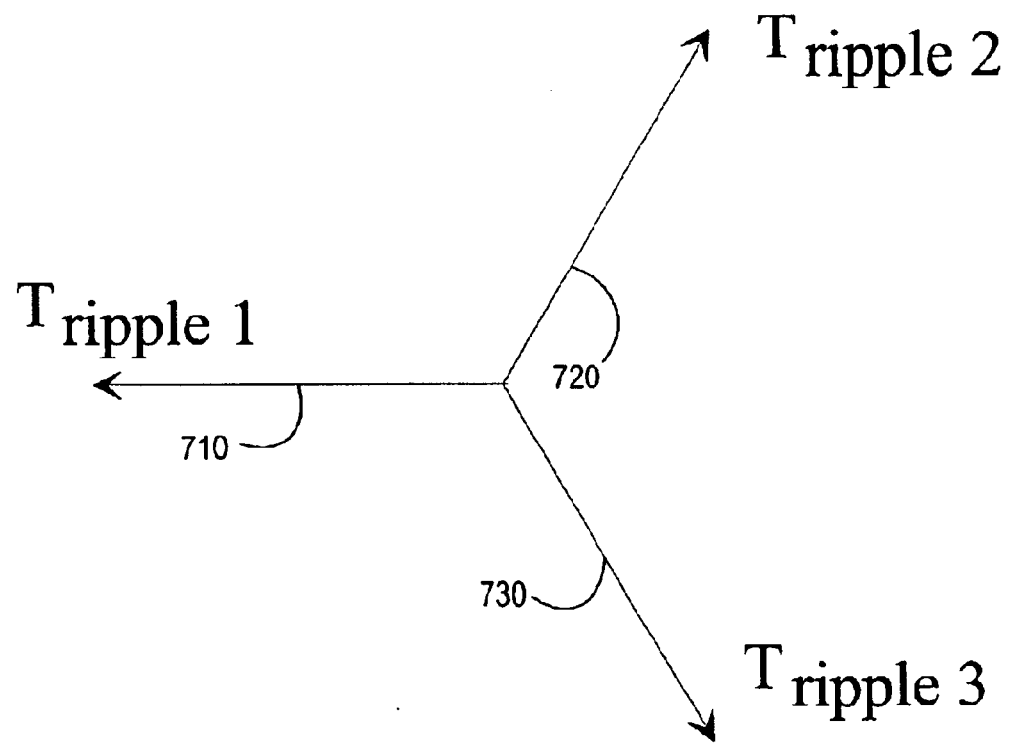
FIG. 7 illustrates a vector diagram representing phase relationship between the torque ripple vectors of each of the skewed three segments shown in FIG. 5, according to an embodiment.

FIG. 7 illustrates a vector diagram representing phase relationship between the torque ripple vectors of each of the skewed three segments 120, 130 and 510 shown in FIG. 5, according to an embodiment. A first torque ripple vector 710 representing the biggest AC component of the torque of the first segment 120, a second torque ripple vector 720 representing the biggest AC component of the torque of the second segment 130 and a third torque ripple vector 730 representing the biggest AC component of the torque of the third segment 510 are shown to have a phase shift of 120 degrees with each other. Thus, the net sum or combination of torque ripple vectors 710, 720 and 730 produced by the three segments 120, 130 and 510 substantially cancel each other during the operation of the rotor 110. The 120 degree phase shift produced by the skewed three segment arrangement shown in FIG. 5 is less than the 180 degree phase shift between the two tangential forces produced in the skewed two-segment arrangement shown in FIG. 3. As a result, the torsional distortion and vibration is advantageously reduced, which in turn reduces the noise level.

Figure 8:
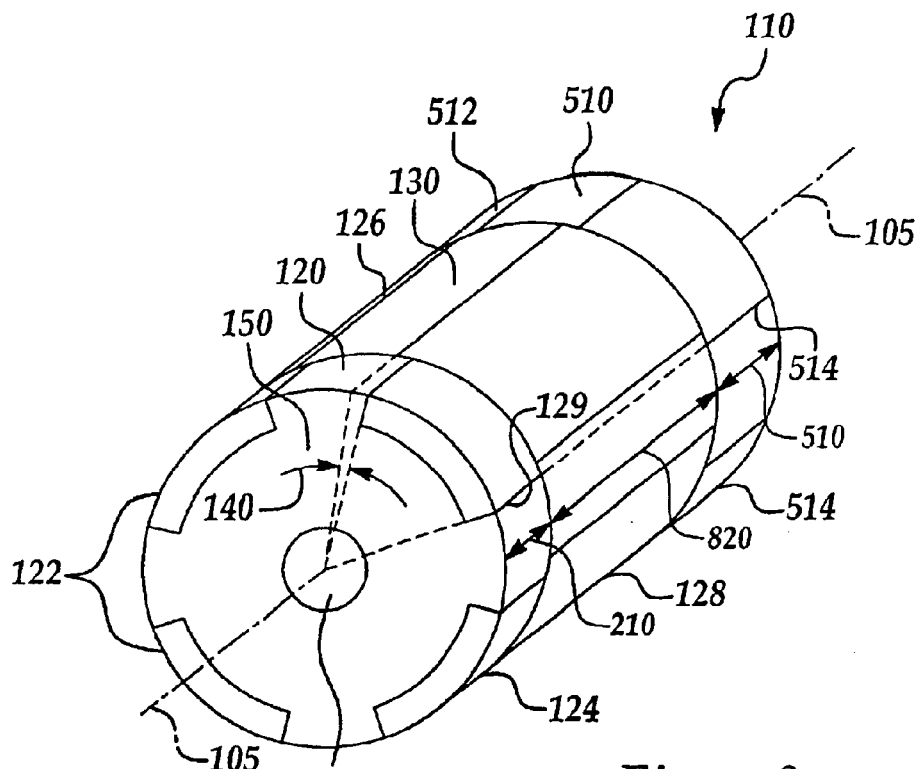
FIG. 8 is a view in perspective of a rotor assembly of a PM motor having three skewed segments with at least two segments of unequal axial lengths, according to an embodiment.

FIG. 8 is a view in perspective of a rotor 110 assembly of a PM motor (not shown) having three skewed segments with at least two segments of unequal axial lengths, according to an embodiment. In this embodiment, the rotor 110 has three rotor segments 120, 130 and 510, which are skewed relative to each other. As described earlier, the first rotor segment 120 is formed along the axis 105 of the rotor and the second rotor segment 130 is formed along the axis 105 and is sequentially adjacent to the first segment 120. The third rotor segment is formed along the axis 105 and is sequentially adjacent to the second segment 130. In this embodiment, the first and third segments 120 and 510 have a substantially equal axial length 810, which is approximately a quarter of the total rotor axial length. The second segment 130 has an axial length 820 that is substantially equal to twice the axial length 810. The axial length 820 is thus approximately half of the total rotor axial length.

The arrangement of the PM's 122, 124, 126, 128, 512 and 514 is same as described in FIG. 5. The dimensions of the permanent magnets 126 and 128 are however different than those permanent magnets 122, 124, 512 and 514.

In this embodiment, the skew for all segments is measured relative to a reference segment such as the first segment 120. In an alternative embodiment, the skew is measured between two adjacent segments. That is, the skew is measured with one segment being selected as a reference, and the other adjacent segment being rotated along the axis 105 in a clockwise or counterclockwise direction to generate the skew.

In this embodiment, the second segment 130 is skewed relative to the first segment 120 by the first angular displacement 140 and the direction may be either counterclockwise or clockwise. Thus PM's 126 and 128 are skewed with the corresponding pairs of north-south permanent magnets 122 and 124 by the first angular displacement 140. In this embodiment, the third segment 510 is not skewed relative to the first segment 120 selected as the reference. As a result, the second angular displacement 520 is zero and is not shown. In the alternative embodiments, any number of pair of north-south permanents magnet may be included in each of the first, second and third segments 120, 130 and 510.

As previously described, the value and direction of the first angular displacement 140 and the second angular displacement 520 is selected to cause a net sum of torque ripple (not shown) produced by each of the segments 120, 130 and 510 to be substantially equal to zero during an operation of the rotor 110 included in the PM motor. That is, the first angular displacement 140 and the second angular displacement 520 are selected so that the net sum or combined torque ripple vectors produced by the three segments 120, 130 and 510 substantially cancel each other during the operation of the rotor 110.

Specifically, in this embodiment, the first angular displacement 140 in mechanical angle is equal to 180/K, where Equation 501 defines K as follows:

$$K = (\text{Torque Ripple Fundamental Frequency})/(\text{Rotor Speed in revolutions per second}). \quad \text{Equation 501}$$

Relative to the first segment 120, the direction of the first angular displacement 140 may be either counterclockwise or clockwise. Relative to the first segment 120, as described before, the second angular displacement 520 is zero.

Figure 9:
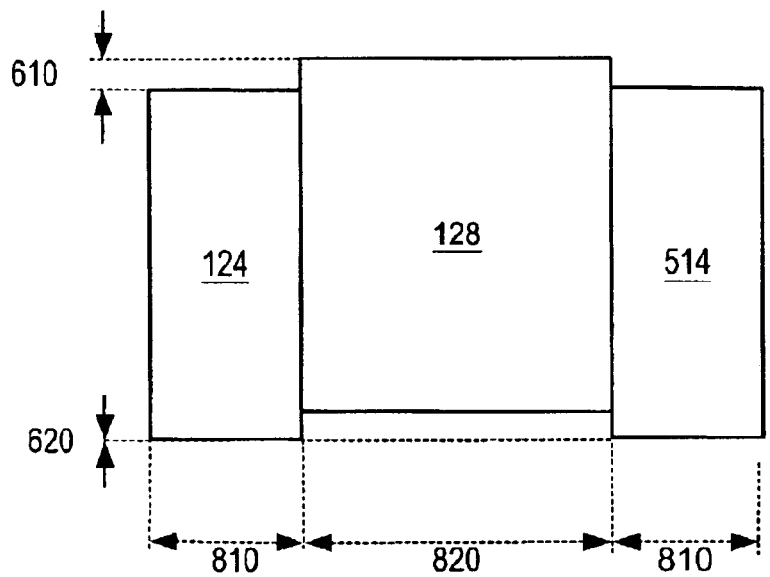
FIG. 9 illustrates relative positions of the three magnets of one pole of the the skewed three segments with at least two segments of unequal axial lengths illustrated in FIG. 8, according to an embodiment.

FIG. 9 illustrates the relative positions of the three magnets of one pole of the skewed three segments with at least two segments of unequal axial lengths illustrated in FIG. 8, according to an embodiment. In this embodiment, the first angular displacement 140 between the first and second segments 120 and 130 is represented by the first peripheral displacement 610. Similarly, the second angular displacement 520 between the first and third segments 120 and 510 respectively is represented by the second peripheral displacement 620. In this embodiment, the second peripheral displacement 620 is equal to zero.

Figure 10:
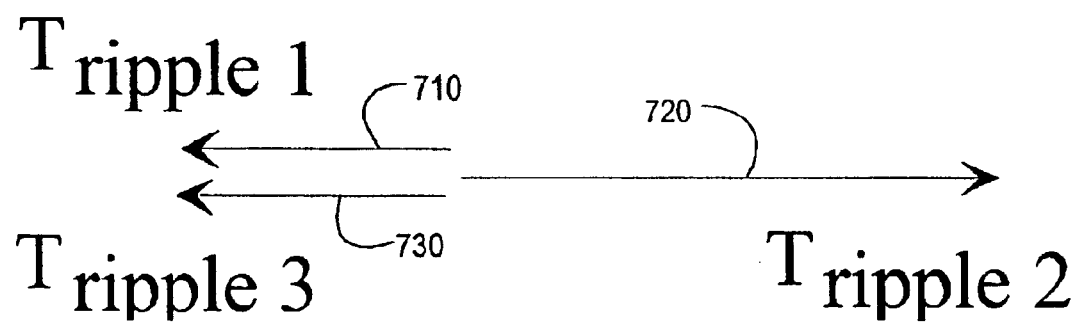
FIG. 10 illustrates a vector diagram representing phase relationship between the torque ripple vectors of each of the skewed three segments with at least two segments having unequal axial lengths shown in FIG. 8, according to an embodiment.

FIG. 10 illustrates a vector diagram representing phase relationship between the torque ripple vectors of each of the skewed three segments 120, 130 and 510 with at least two segments having unequal axial lengths shown in FIG. 8, according to an embodiment. The first torque ripple vector 710 representing the biggest AC component of the torque of the first segment 120, and the third torque ripple vector 730 representing the biggest AC component of the torque of the third segment 510 are shown to have half the magnitude and 180 degree phase shift compared to the second torque ripple vector 720 representing the biggest AC component of the torque of the second segment 130. Thus, the net sum or combination of torque ripple vectors 710, 720 and 730 produced by the three segments 120, 130 and 510 substantially cancel each other during the operation of the rotor 110. Since there is no skew between the segments 120 and 510, the stator and rotor torsional distortion and vibration is advantageously reduced, which in turn reduces the noise level compared with the skewed two-segment arrangement shown in FIG. 3.

Figure 11:
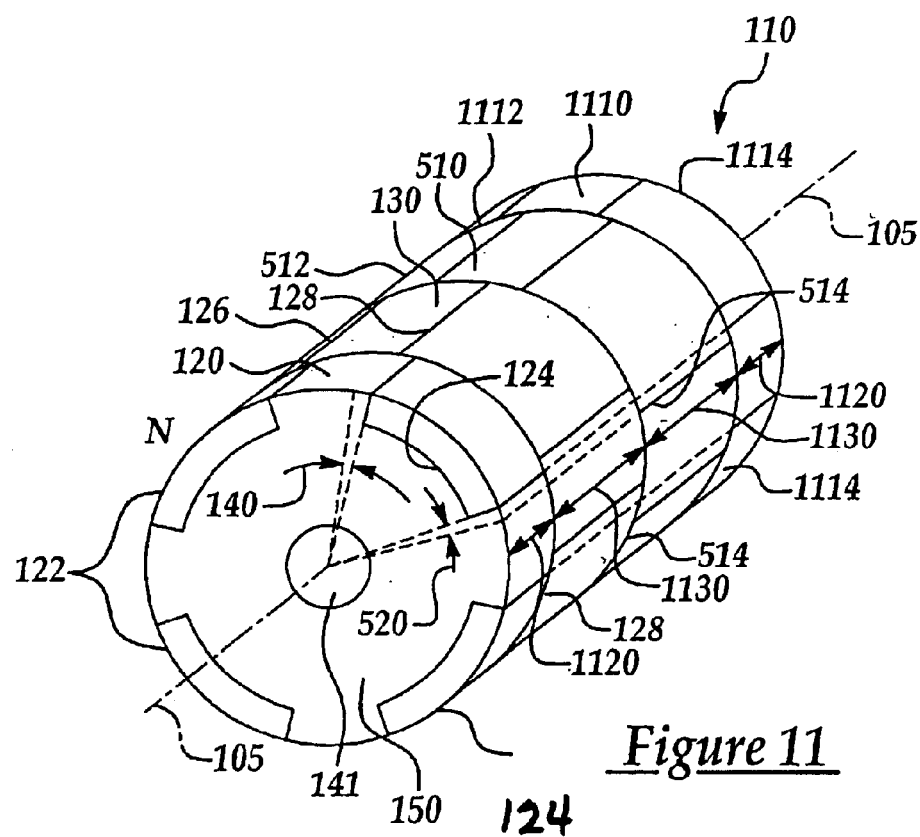
FIG. 11 is a view in perspective of a rotor assembly of a PM motor having four skewed segments with at least two segments having unequal axial lengths, according to an embodiment.

FIG. 11 is a view in perspective of a rotor 110 assembly of a PM motor (not shown) having four skewed segments with at least two segments having unequal axial lengths, according to an embodiment. In this embodiment, the rotor 110 has four rotor segments 120, 130, 510 and 1110, which are skewed relative to each other. As described earlier, the first rotor segment 120 is formed along the axis 105 of the rotor and the second rotor segment 130 is formed along the axis 105 and is sequentially adjacent to the first segment 120. The third rotor segment 510 is formed along the axis 105 and is sequentially adjacent to the second segment 130. The fourth rotor segment 1110 is formed along the axis 105 and is sequentially adjacent to the third segment 510. In this embodiment, the first and fourth segments 120 and 1110 have a substantially equal axial length 1120, which is approximately a sixth of the total rotor axial length. The second segment 130 and the third segment 510 each has an axial length 1130 that is substantially equal to twice the axial length 1110. The axial length 1130 is thus approximately a third of the total rotor axial length.

The arrangement of the PM's 122, 124, 126, 128, 512 and 514 is same as described in FIG. 8. The fourth segment 1110 has two pairs of north-south permanent magnets 1112 and 1114 disposed at a substantially equal interval in a peripheral direction of the rotor 110. In this embodiment, the PM's 1112 and 1114 are disposed at a right angle to each other in a peripheral direction of the rotor 110. The dimensions of the permanent magnets 126, 128, 512 and 514 are substantially the same and different than those permanent magnets 122, 124, 1112 and 1114. The dimensions of the permanent magnets 122, 124, 1112 and 1114 are substantially the same.

In this embodiment, the skew for all segments is measured relative to a reference segment such as the first segment 120. In an alternative embodiment, the skew is measured between two adjacent segments. That is, the skew is measured with one segment being selected as a reference, and the other adjacent segment being slightly rotated along the axis 105 in a clockwise or counterclockwise direction to generate the skew.

In this embodiment, the second segment 130 is skewed relative to the first segment 120 by the first angular displacement 140 and the direction may be either counterclockwise or clockwise. In this embodiment, the first angular displacement 140 in mechanical angle is equal to 120/K, where Equation 501 defines K as follows:

K=(Torque Ripple Fundamental Frequency)/(Rotor Speed in revolutions per second).     Equation 501

Thus PM's 126 and 128 are skewed with the corresponding pairs of north-south permanent magnets 122 and 124 by the first angular displacement 140. In this embodiment, the third segment 130 is skewed relative to the first segment 120 selected as the reference by the second angular displacement 520, which has the same value as 140 and an opposite direction In this embodiment, the fourth segment 1110 is aligned with the reference, i.e., not skewed relative to the first segment 120. Hence a third angular displacement 1140 is zero and is not shown. In alternative embodiments, any number of pairs of north-south permanent magnets may be included in each of the first, second, third and fourth segments 120, 130, 510 and 1110.

As previously described, the value and direction of the angular displacements 140, 520 and 1140 (not shown) are selected to cause a net sum of torque ripple (not shown) produced by each of the segments 120, 130, 510 and 1110 to be substantially equal to zero during an operation of the rotor 110 included in the PM motor. That is, the first angular displacement 140, the second angular displacement 520 and the third angular displacement 1140 are selected so that the net sum or combined torque ripple vectors produced by the four segments 120, 130, 510 and 1110 substantially cancel each other during the operation of the rotor 110.

In an alternative embodiment, the four skewed segment rotor similar to that illustrated in FIG. 11 have equal axial lengths (not shown). In this embodiment, the rotor 110 has four rotor segments 120, 130, 510 and 1110, which are skewed relative to each other. As described earlier, the first rotor segment 120 is formed along the axis 105 of the rotor and the second rotor segment 130 is formed along the axis 105 and is sequentially adjacent to the first segment 120. The third rotor segment 510 is formed along the axis 105 and is sequentially adjacent to the second segment 130. The fourth rotor segment 1110 is formed along the axis 105 and is sequentially adjacent to the third segment 510. In this embodiment, each of the first, second, third and fourth segments 120, 130, 510 and 1110 have substantially equal axial lengths (not shown), which is approximately a quarter of the total rotor axial length. In this embodiment, the second segment 130 and the third segment 510 each has an axial length 1130 that is substantially equal to the axial length 1120 (not shown).

The arrangement of the PM's 122, 124, 126, 128, 512 and 514 is same as described in FIG. 8. The fourth segment 1110 has two pairs of north-south permanent magnets 1112 and 1114 disposed at a substantially equal interval in a peripheral direction of the rotor 110. In this embodiment, the PM's 1112 and 1114 are disposed at a right angle to each other in a peripheral direction of the rotor 110. In this embodiment, the dimensions of the permanent magnets 122, 124, 126, 128, 512, 514, 1112 and 1114 are substantially the same (not shown).

In this embodiment, the skew for all segments is measured relative to a reference segment such as the first segment 120. In an alternative embodiment, the skew is measured between two adjacent segments. That is, the skew is measured with one segment being selected as a reference, and the other adjacent segment being slightly rotated along the axis 105 in a clockwise or counterclockwise direction to generate the skew.

In this embodiment, the second segment 130 is skewed relative to the first segment 120 by the first angular displacement 140 and the direction may be either counterclockwise or clockwise. In this embodiment, the first angular displacement 140 in mechanical angle is equal to 180/K, where Equation 501 defines K as follows:

K=(Torque Ripple Fundamental Frequency)/(Rotor Speed in revolutions per second).     Equation 501

Thus PM's 126 and 128 are skewed with the corresponding pairs of north-south permanent magnets 122 and 124 by the first angular displacement 140. In this embodiment, the third segment 130 is skewed relative to the first segment 120 selected as the reference by the second angular displacement 520, which has the same value as 140 and an opposite direction. In this embodiment, the fourth segment 1110 is aligned with the reference, i.e., not skewed relative to the first segment 120. Hence a third angular displacement 1140 is zero and is not shown. In alternative embodiments, any number of pairs of north-south permanent magnets may be included in each of the first, second, third and fourth segments 120, 130, 510 and 1110.

As previously described, the value and direction of the angular displacements 140, 520 and 1140 (not shown) are selected to cause a net sum of torque ripple (not shown)

produced by each of the segments 120, 130, 510 and 1110 to be substantially equal to zero during an operation of the rotor 110 included in the PM motor. That is, the first angular displacement 140, the second angular displacement 520 and the third angular displacement 1140 are selected so that the net sum or combined torque ripple vectors produced by the four segments 120, 130, 510 and 1110 substantially cancel each other during the operation of the rotor 110.

Figure 12A:
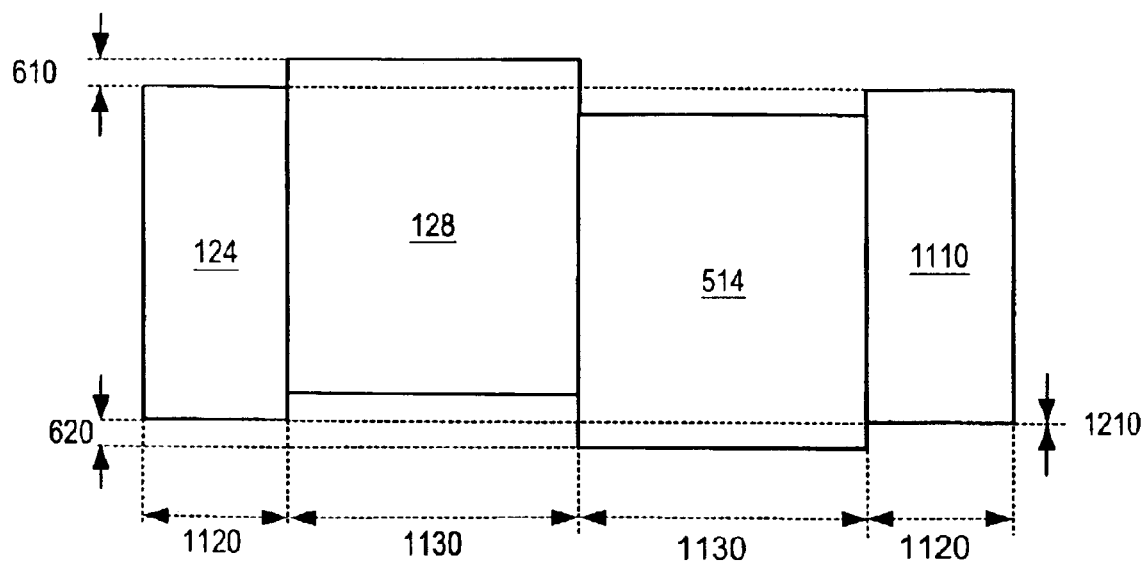
FIG. 12A illustrates relative positions of the four magnets of one pole of the skewed four segments with at least two segments having unequal axial lengths illustrated in FIG. 11, according to an embodiment.

FIG. 12A illustrates the relative positions of the four magnets included in the skewed four segments with at least two segments having unequal axial lengths illustrated in FIG. 11, according to an embodiment. In this embodiment, the first angular displacement 140 between the first and second segments 120 and 130 is represented by the first peripheral displacement 610. Similarly, the second angular displacement 520 between the first and third segments 120 and 510 respectively is represented by the second peripheral displacement 620 and the third angular displacement 1140 between the first and fourth segments 120 and 1110 respectively is represented by a third peripheral displacement 1210. In this embodiment, the first peripheral displacement 610 is same as the second peripheral displacement 620 but is in the opposite direction. The third peripheral displacement 1210 is equal to zero since the fourth segment 1110 is aligned with the first segment 120.

Figure 13A:
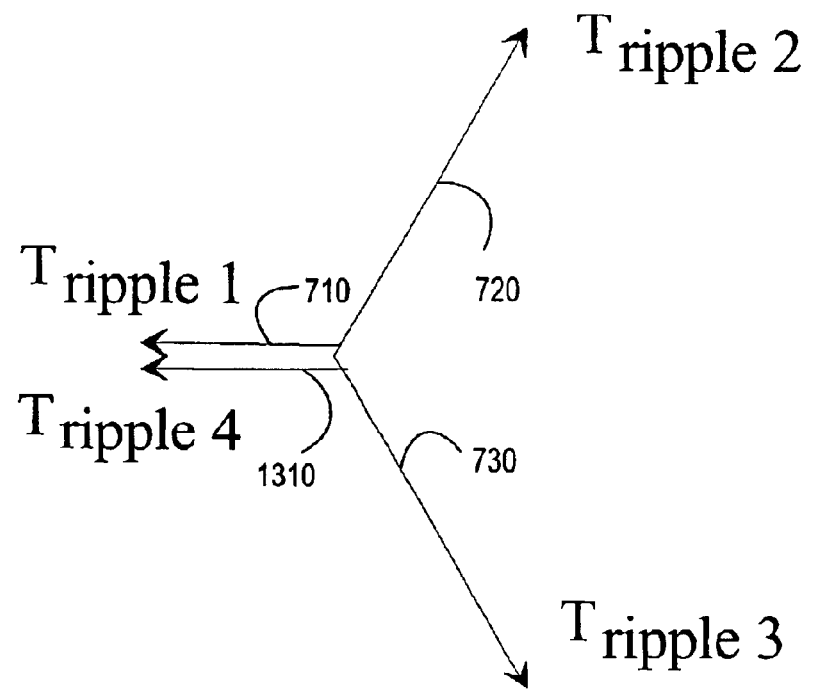
FIG. 13A illustrates a vector diagram representing phase relationship between the torque ripple vectors of each of the skewed four segments with at least two segments having unequal axial lengths shown in FIG. 11, according to an embodiment.

FIG. 13A illustrates a vector diagram representing phase relationship between the torque ripple vectors of each of the skewed four segments 120, 130, 510 and 1110 with at least two segments having unequal axial lengths shown in FIG. 11, according to an embodiment. The first torque ripple vector 710 representing the biggest AC component of the torque of the first segment 120, and a fourth torque ripple vector 1310 representing the biggest AC component of the torque of the fourth segment 1110 are shown to have half the magnitude of the third torque ripple vector 730 or the second torque ripple vector 720. The first torque ripple vector 710 and the fourth torque ripple vector 1310 have no phase shift with respect to each other. The second torque ripple vector 720 representing the biggest AC component of the torque of the second segment 130 is shown to have a 120-degree phase shift (lagging) with respect to the torque ripple vector 710 or 1310. The third torque ripple vector 730 representing the biggest AC component of the torque of the third segment 510 is shown to have a 240-degree phase shift (lagging) with respect to the torque ripple vector 710 or 1310. Thus, the net sum or combination of torque ripple vectors 710, 720, 730 and 1310 produced by the four segments 120, 130, 510 and 1110 substantially cancel each other during the operation of the rotor 110. Since there is no skew between the segments 120 and 1110, the stator and rotor torsional distortion and vibration of the skewed four segment arrangement with at least two segments having unequal axial lengths shown in FIG. 11 is advantageously reduced, which in turn reduces the noise level compared with the skewed two-segment arrangement shown in FIG. 3.

Figure 12B:
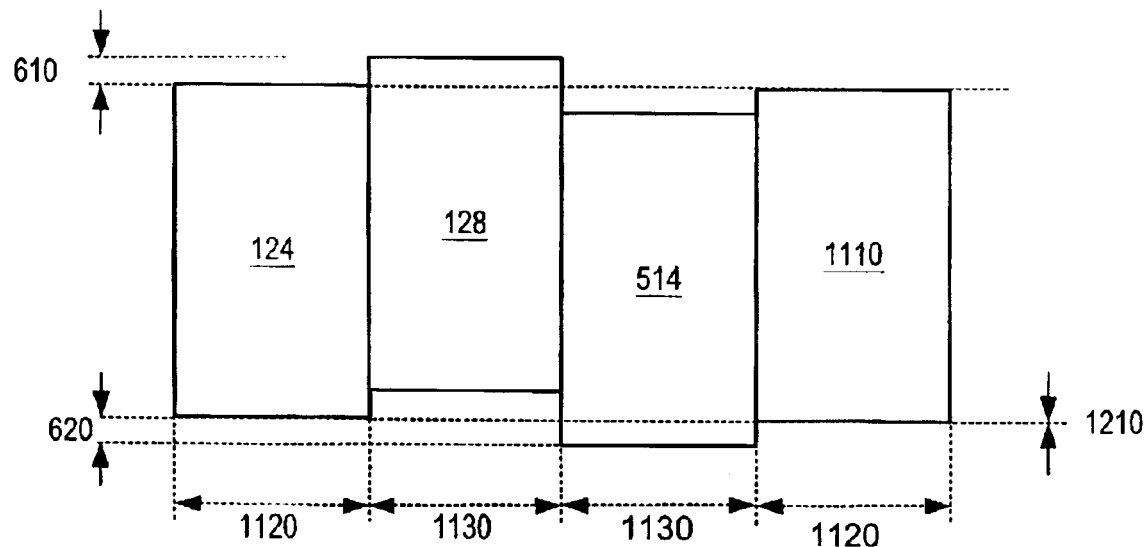
FIG. 12B illustrates relative positions of the four magnets of one pole of the skewed four segments with each segment having equal axial lengths, according to an embodiment.

FIG. 12B illustrates the relative positions of the four magnets of one pole included in the skewed four segments having substantially equal axial lengths, according to an alternative embodiment. In this embodiment, each of the four permanent magnets 124, 128, 514, and 1110 have substantially equal axial lengths, which is approximately a quarter of the total rotor axial length. In this embodiment, the second and third permanent magnets 128 and 514 have an axial length 1130 that is substantially equal to the axial length 1120 of permanent magnets 124 and 1110. In this embodiment, the first angular displacement 140 between the first and second segments 120 and 130 is represented by the first peripheral displacement 610. Similarly, the second angular displacement 520 between the first and third segments 120 and 510 respectively is represented by the second peripheral displacement 620 and a third angular displacement 1140 between the first and fourth segments 120 and 1110 respectively is represented by a third peripheral displacement 1210. In this embodiment, the first peripheral displacement 610 is same as the second peripheral displacement 620 but is in the opposite direction. The third peripheral displacement 1210 is equal to zero since the fourth segment 1110 is aligned with the first segment 120.

Figure 13B:
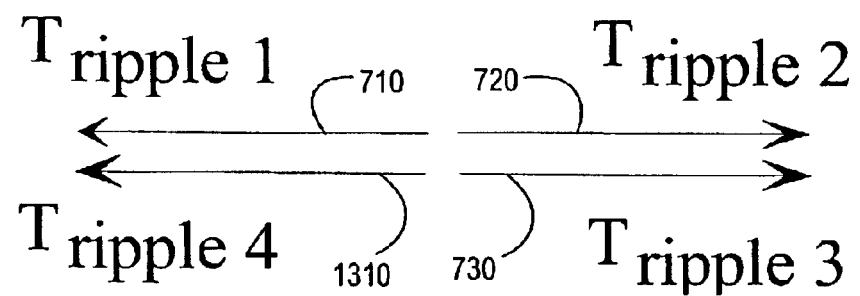
FIG. 13B illustrates a vector diagram representing phase relationship between the torque ripple vectors of each of the skewed four segments with each segment having equal axial lengths, according to an embodiment.

FIG. 13B illustrates a vector diagram representing phase relationship between the torque ripple vectors of each of the skewed four segments 120, 130, 510 and 1110 with each of the four segments having equal axial lengths, according to an embodiment. The first torque ripple vector 710 representing the biggest AC component of the torque of the first segment 120, and a fourth torque ripple vector 1310 representing the biggest AC component of the torque of the fourth segment 1110 are shown to have the same magnitude of the third torque ripple vector 730 or the second torque ripple vector 720. The first torque ripple vector 710 and the fourth torque ripple vector 1310 have no phase shift with respect to each other. The second torque ripple vector 720 representing the biggest AC component of the torque of the second segment 130 is shown to have a 180-degree phase shift with respect to the torque ripple vector 710 or 1310. The third torque ripple vector 730 representing the biggest AC component of the torque of the third segment 510 is also shown to have a 180-degree phase shift with respect to the torque ripple vector 710 or 1310. Thus, the net sum or combination of torque ripple vectors 710, 720, 730 and 1310 produced by the four segments 120, 130, 510 and 1110 substantially cancel each other during the operation of the rotor 110. Since there is no skew between the segments 120 and 1110, the stator and rotor torsional distortion and vibration of the skewed four segment arrangement having substantially equal axial lengths is advantageously reduced, which in turn reduces the noise level compared with the skewed two-segment arrangement shown in FIG. 3.

Figure 14:
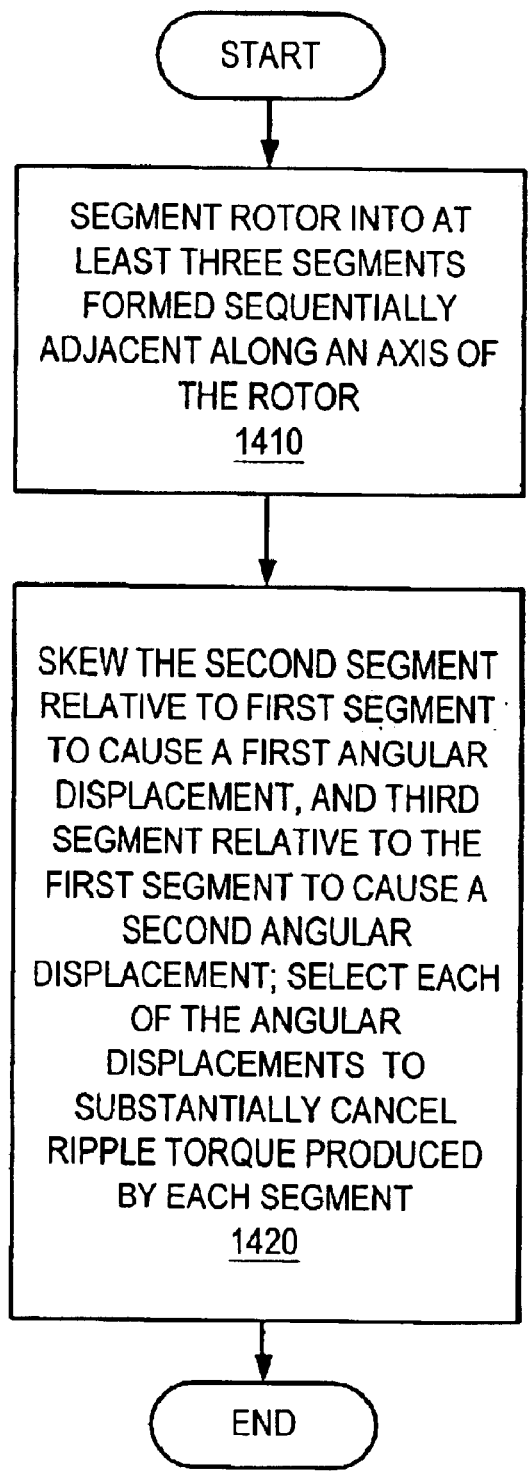
FIG. 14 is a flow chart illustrating a method for reducing the torque ripple 220 of the PM motor, according to one embodiment of the present invention.

FIG. 14 is one embodiment of a flow chart illustrating a method for reducing the torque ripple 220 of the PM motor. In step 1410, the rotor 110 of the PM motor is segmented into at least three rotor segments, e.g., the rotor segments 120, 130 and 510. The at least three rotor segments 120, 130 and 510 are formed sequentially adjacent along the axis 105 of the rotor 110. Each of the at least three rotor segments 120, 130 and 510 includes at least one pair of permanent magnets, e.g., PM's 122, 124, 126, 128, 512 and 514, disposed at a substantially equal interval in a peripheral direction of the rotor 110.

In step 1420, the first segment 120 and the second segment 130 are skewed along the axis 105 to cause the first angular displacement 140. Similarly, the first segment 120 and the third rotor segment 510 are skewed along the axis 105 to cause the second angular displacement, 520. Particular values for the first angular displacement 140 and the second angular displacement 520 are selected to cause a net sum of torque ripple produced by each of the at least three segments 120, 130 and 510 to be substantially equal to zero during an operation of the motor.

Various steps of FIG. 14 may be added, omitted, combined, altered, or performed in different orders. For example, in one embodiment, step 1420 may be set as two parallel steps for introducing the first angular displacement 140 and the second angular displacement 520 respectively.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, those of ordinary skill in the art will appreciate that the processes of the present invention are capable of being applied to a variety of rotors having multiple segments, with each segment having the same or a different axial length.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A permanent magnet rotor comprising:
   at least three rotor segments formed sequentially adjacent along an axis of the rotor, wherein each of the at least three rotor segments includes at least one pair of permanent magnets disposed at a substantially equal interval in a peripheral direction of the rotor;
   a first angular displacement formed between a first and second segment of the at least three rotor segments;
   a second angular displacement formed between the first and a third segment of the at least three rotor segments;
   wherein the first and second angular displacements are selected to cause a net sum of torque ripple produced by each of the at least three rotor segments to be substantially equal to zero during an operation of the rotor; and
   wherein the second rotor segment has an axial length approximately equal to one half of a total rotor axial length, wherein each of the first and third rotor segments have an axial length approximately equal to a quarter of the total rotor axial length.

2. The rotor of claim 1, wherein the first angular displacement is selected to be equal to 180 divided by a factor K, wherein the factor K is defined as a ratio of fundamental frequency of the torque ripple to an angular speed of the rotor measured in revolutions per second.

3. The rotor of claim 1, wherein the second angular displacement is selected to be equal to zero.

4. A permanent magnet rotor comprising:
   at least three rotor segments formed from sequentially adjacent along an axis of the rotor, wherein each of the at least three rotor segments includes at least one pair of permanent magnets disposed at a substantially equal interval in a peripheral direction of the rotor;
   a first angular displacement formed between a first and a third segment of the at least three rotor segments;
   a second angular displacement formed between the first and a third segment of the at least three rotor segments;
   a fourth rotor segment formed along tho axis of the rotor and adjacent to the third segment, the fourth segment having the at least one pair of permanent magnets disposed at the substantially equal interval in the peripheral direction of the rotor;
   wherein the first and fourth segments are skewed relative to each other by a third angular displacement, wherein the first, second and third angular displacements are selected to cause a net sum of a first torque ripple produced by the first segment, a second torque ripple produced by the second segment, a third torque ripple produced by the third segment and a fourth torque ripple produced by the fourth segment to be substantially equal to zero during the operation of the rotor; and
   wherein each of the first and fourth rotor segments have an axial length approximately equal to a sixth of a total rotor axial length, wherein each of the second and third rotor segments have an axial length approximately equal to a third of the total rotor axial length.

5. The rotor of claim 4, wherein the first angular displacement is selected to be equal to 120 divided by a factor K, wherein the factor K is defined as a ratio of fundamental frequency of the torque ripple to an angular speed of the rotor measured in revolutions per second.

6. The rotor of claim 4, wherein the first angular displacement is in a counterclockwise or clockwise direction relative to the first segment.

7. The rotor of claim 4, wherein the second angular displacement is selected to be equal to the first angular displacement and has a direction opposite to the first angular displacement.

8. The rotor of claim 4, wherein the third angular displacement is substantially equal to zero.